Figure 1:
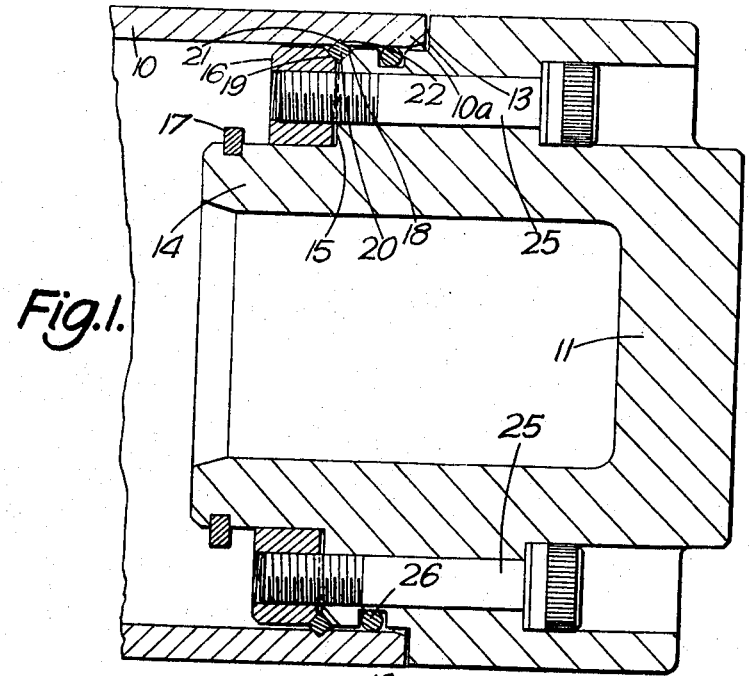

Aug. 8, 1967  E. J. JOFEH  3,334,937

SECURING OF CLOSURES OR END CAPS TO CYLINDERS

Filed June 16, 1965

INVENTOR
EDGAR JOHN JOFEH
BY Mawhinney & Mawhinney

United States Patent Office 3,334,937
Patented Aug. 8, 1967

3,334,937
SECURING OF CLOSURES OR END CAPS
TO CYLINDERS
Edgar John Jofeh, Wolverhampton, England, assignor to
Desoutter Lang Pneumatic Limited, Wolverhampton,
Staffordshire, England, a British company
Filed June 16, 1965, Ser. No. 464,288
6 Claims. (Cl. 292—256.67)

This invention relates to cylinders for housing pistons and has a useful but not exclusive application in the cylinders of linear actuators, for example pneumatic linear actuators. More particularly, the invention is concerned with the attachment of a closure or end cap to the member which provides the side walls of the cylinder.

According to this invention there is provided a cylinder for housing a piston, which cylinder comprises a first part bored to provide the cylinder space within it, and a closure part at one end at least of the first part, which closure part is axially located on the end of the first part by means comprising a radially-facing peripheral groove in the cylinder part, a peripheral groove in the closure part and facing the groove in the cylinder part, a resilient ring which is capable of radial expansion and contraction and which is capable, in one of these conditions, of being accommodated wholly in one of the grooves and, in the other of these conditions, of disposition such that part of the radial thickness of the ring is disposed in said one of the grooves and part lies in the other of the grooves, and wedge means operable from outside the cylinder for adjusting the diameter of the ring to move the ring from one position to the other.

According to a preferred feature of the invention the closure part has a reduced-diameter portion which fits within the bore of the first part at said one end, the groove in the first part being formed on the radially inner surface of the first part and the groove in the closure part being formed on said reduced-diameter portion and facing radially outwards. Preferably, the two side walls of the groove in the first part are each inclined in a radially inward direction. The groove in the first part may conveniently be of triangular cross section, and the two sides of the groove may be inclined at the same angle as each other, for example 45°, to the axial direction. In a preferred construction the groove in the closure is also of triangular cross section, the angle of inclination of the two side walls of the groove being 45°, and the ring is of square cross section and has its four sides respectively resting against the four side walls of the two grooves.

In preferred constructions according to the invention the wedge means is provided by a side wall of one of the grooves, said side wall being formed on a member the position of which is axially adjustable from outside the cylinder towards and away from the other side wall of this groove and being inclined towards the other of the grooves, the construction and arrangement being such that, on axial adjustment of the position of the member, said inclined side wall of the groove causes adjustment of the diameter of the ring. Preferably one of the grooves is the groove provided by the closure part. Said member may be slidably mounted on a portion of the closure part which projects into the cylinder, said member being held captive against axial disengagement from said portion of the closure part. It is preferred that the axial position of said member is adjustable by screw means which is operable from outside the cylinder.

In another arrangement according to the invention a plurality of axially-extending screws are screwed into one of the cylinder parts and have each a conical or substantially conical shank portion which constitutes the wedge means and which engages a generally radially facing surface of the ring in a manner such that adjustment of the screws adjusts the diameter of the ring.

Figure 2:
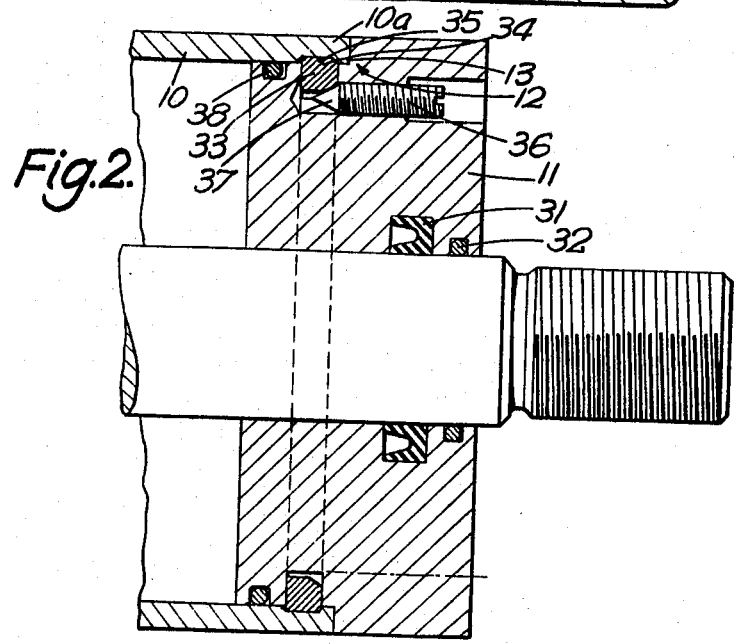

Two embodiments of the invention will now be described as applied in a pneumatic actuator in the form of a cylinder having a piston reciprocably mounted therein. The description makes reference to the accompanying drawings in which:

FIGURE 1 shows an axial section of one end portion of a cylinder embodying the invention in the first form, and FIGURE 2 shows a similar view of an actuator cylinder embodying the second form of the invention.

Referring to FIGURE 1 of the drawings, the cylinder comprises a tubular first part 10 in which the piston slides, and a closure part at each end of the tubular part. The closure 11 shown blanks off the whole area of the end of the cylinder space, but the other closure (not shown) is annular so as to provide a guideway for a piston rod fixed to the piston (not shown). Each of the closures provides a peripheral rebate the dimensions of which are such that the end portion 10a of the tubular part fits on the rebated part and so that the end of the tubular part comes close to, but does not abut, a shoulder 13 formed at the end of the rebate further from the piston. That part of each closure which projects into the cylinder space has its end portion 14 nearer the piston stepped down in diameter so as to form a shoulder 15, and has an annular part 16 mounted for axial sliding movement on the end portion 14. A circlip 17 disposed in a groove in the end portion 14 holds the annular part 16 captive. The outer diameter of part 16 of the closure is the same as that of the rebated part which it faces axially. The radially outer corner of the shoulder 15 and the radially outer corner of part 16 nearer shoulder 15 are chamfered at 45° as shown to provide surfaces 18, 19 which together form a groove locating a ring 20. Ring 20 has a gap in its periphery so as to be expansible and contractible. In the present construction, ring 20 is of square cross-section, and its radially-outer faces respectively fit squarely against the sides 21, 22 of a V-section groove formed on the internal surface of the tubular part 10.

Four screws 25, spaced apart by 90° round the axis of the cylinder, extend axially through drillings in the main or outer part of the closure and into screw threaded holes in the annular part 16 of the closure, the undersides of the heads of the screws resting against shoulders formed by counterbores drilled to receive the heads of the screws. Thus by adjusting the screws, the axial gap between the two portions of the closure can be adjusted. When this axial gap is greatest, the ring 20 contracts so as to be wholly accommodated in the groove defined between the two parts of the closure to enable the closure and gapped ring 20 to be inserted in or removed from the end of the tubular part 10. As the axial gap is decreased, the ring is expanded by the wedge action of the chamfered surfaces 18, 19 so as to project outwards into the V-section groove on the inner surface of the tubular part. The ring 20, being partly in each groove, then holds the closure and tubular part against relative axial movement. It is arranged that an axial clearance remains between annular part 16 and shoulder 15 when the ring 20 is fully expanded into the groove in the tubular part 10.

A peripheral groove in the rebated portion of the main closure part accommodates a sealing ring 26 which bears against the plain cylindrical inner surface of the tubular part 10 to prevent leakage from the cylinder past the closure.

The V-section form of the groove in the tubular part 10 is advantageous in that, when the piston with its rings is being inserted into or removed from the cylinder, the piston rings, which tend to open to their free diameter as they come opposite the groove in the tubular part, are progressively re-compressed by the inclined sides of the V-groove as the relative axial movement of the piston and cylinder is continued.

The clearances between the shoulder 13 and the end of the tubular part 10, and between shoulder 15 and annular part 16 ensure that the gapped ring can expand fully into the V-section groove in the tubular part 10.

FIGURE 2 shows a second embodiment of the invention applied to an actuator and shows the closure part of the cylinder through which the piston rod 30 extend, sealing rings 31, 32 being mounted in grooves in the closure part round the piston rod. In FIGURE 2, parts corresponding to those in FIGURE 1 have the same reference numerals. In this arrangement, the annular portion 16 and the stepped-down end portion 14 for the gapped ring are not provided. Instead, the reduced diameter portion formed by the rebate 12 has a first peripheral groove 33 accommodating a ring 34 which is of generally rectangular section and which has a gap (not shown) in its periphery so as to be expansible and contractible. The depth of the groove 33 is sufficient to enable the ring to be fully accommodated in the groove. The tubular part 10 has formed on its radially inner surface a shallow rectangular section groove 35 which, when the tubular part abuts the shoulder 13, faces the groove 33 in the closure part.

In order to expand the ring, three axially-extending screws 36, spaced apart by 120° round the axis of the cylinder, are mounted in the closure with their axes aligned with the bottom of the groove containing the ring. The shank of each screw 36 is screw threaded and is received in a screw threaded drilling in the closure, and the end portion 37 of each screw is smooth and conical and tapers towards the end of the screw at an included angle of 60°. The tapering portion 37 of each screw extends across the groove 33 containing the gapped ring, the radially inner surface of the ring resting against the tapering portions of the screws. The heads of the screws are countersunk in the closure member and are accessible from the outside of the actuator. The ring has as least the edge portion of its radially inner face inclined to the axis of the cylinder so as to rest squarely against the tapering flanks of the screws. The lengths of the tapering and screw threaded parts of the screws and the alignment of the screws are such that the screws can be unscrewed to permit the gapped resilient ring to contract and to be accommodated wholly in the groove 33 in the closure and can be screwed home to expand the ring to cause it to project into the inwardly facing groove 35 in the tubular part. In the latter position, the inner part of the thickness of the ring remains in the groove in the closure so that the closure is held against axial displacement relative to the tubular part. A second peripheral groove in the rebated part on the side of the first groove nearer the piston accommodates a sealing ring 38.

Both of the constructions described above possess the advantage that the wedge action ensures that the end covers are correctly aligned with the cylinder bore, and it is therefore not necessary to use tubing of such close tolerances for the cylinder as may be the case when the end cover is located and aligned by the cylinder bore.

The expansible ring could be made in two parts instead of one if desired.

I claim:
1. A cylinder for housing a piston, which cylinder comprises:
   (a) first part bored to provide a cylinder space within it;
   (b) a closure part at one end of the first part;
   (c) a portion of the closure part which is disposed within the bore of the first part;
   (d) a member movably mounted on said portion;
   (e) a radially facing peripheral first groove provided by opposed inclined faces on the portion of the closure part and the member movably mounted thereon respectively;
   (f) a triangular cross-section peripheral groove in said first part;
   (g) which groove faces the first said groove;
   (h) a resilient ring which is capable of radial expansion and contraction;
   (i) which ring is capable when contracted of being accommodated within the first said groove and spaced from the second said groove;
   (j) and which ring is capable when expanded of being accommodated partially within the first said groove and partially within the second said groove;
   (k) means for moving said movable member relatively to said portion of the closure part to tend to close the first said groove to expand the ring radially into the second said groove, and to tend to open the first said groove to permit the ring to contract whereby the ring move radially out of the second said groove;
   (l) which means are operable from outside the cylinder.

2. A cylinder as claimed in claim 1, wherein the angle of inclination of two faces forming the second groove in said first part is approximately 45°.

3. A cylinder as claimed in claim 1, wherein the angle of inclination of said inclined faces of the groove in the closure is approximately 45°.

4. A cylinder as claimed in claim 1, wherein the ring is of square cross-section and has its four sides respectively resting against the four faces of the two grooves.

5. A cylinder as claimed in claim 1, wherein said member is slidably mounted on a portion of the closure part which projects into the cylinder, said member being held captive against axial disengagement from said portion of the closure part.

6. A cylinder as claimed in clam 1 wherein the axial position of said member is adjustable by screw means which forms said means for moving said movable member.

References Cited

UNITED STATES PATENTS

| 1,734,236 | 11/1929 | Smith et al. | 292—256.67 |
| 2,584,100 | 1/1952 | Uecker | 292—256.65 X |
| 2,687,910 | 8/1954 | Petch | 292—256.65 |
| 2,869,910 | 1/1959 | Fisher et al. | 292—256.67 |
| 2,877,732 | 3/1959 | Eaton | 292—256.67 X |
| 3,250,331 | 4/1966 | Boyle | 285—321 X |

MARVIN A. CHAMPION, *Primary Examiner.*

RICHARD E. MOORE, *Examiner.*